Figure 1:
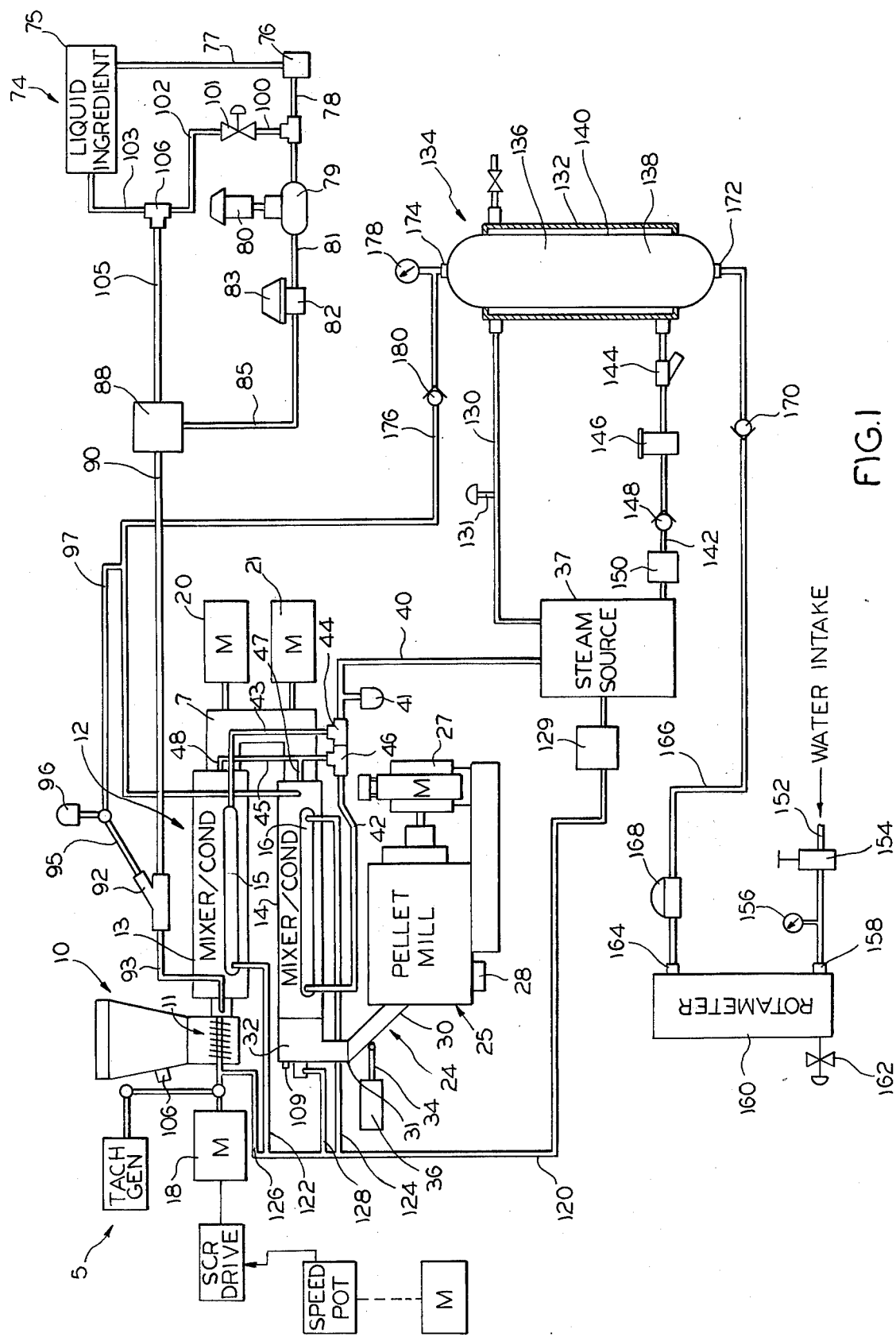

United States Patent [19]

Zarow

[11] 4,183,675

[45] Jan. 15, 1980

[54] ENERGY CONSERVING METHOD AND APPARATUS FOR PELLETING PARTICULATE ANIMAL FEED

[75] Inventor: Albert I. Zarow, Mt. Pulaski, Ill.

[73] Assignee: Feed Pelleting, Inc., Mt. Pulaski, Ill.

[21] Appl. No.: 953,220

[22] Filed: Oct. 20, 1978

[51] Int. Cl.$^2$ ............................................. B01F 15/06
[52] U.S. Cl. ..................... 366/144; 99/487; 34/54; 241/34; 99/516
[58] Field of Search ................. 99/487, 483, 486, 516; 137/2, 487.5; 426/67; 241/34, 36; 34/54; 366/144, 145, 147, 148, 149

[56] References Cited

U.S. PATENT DOCUMENTS

| | | | |
|---|---|---|---|
| 2,035,893 | 3/1936 | Jonsson | 99/487 |
| 2,324,874 | 7/1943 | Peters | 99/487 |
| 3,255,975 | 6/1966 | Malin | 241/34 |
| 3,573,924 | 4/1971 | Zarow | 426/69 |
| 3,932,736 | 1/1976 | Zarow | 99/487 |

*Primary Examiner*—Robert W. Jenkins
*Attorney, Agent, or Firm*—McWilliams, Mann & Zummer

[57] ABSTRACT

A method and apparatus for pelleting particulate animal feed in accordance with a feed pelleting system in which the feed is fed from a bin through a mixer/conditioner, where selected amounts of heat and moisture are added to the feed, and into a pellet producing machine, wherein in accordance with the system the feed is heated by heating the mixer/conditioner using a closed circuit live steam system that returns to the heat source the condensate form by heating the mixer/conditioner, and wherein the moisture is added to the feed as it passes through the mixer/conditioner by inserting hot water at a temperature that approximates but is below that causing vaporization of the insert water, with the insert water being heated by a closed circuit live steam system that returns to the heat source the condensate formed by heating the insert water.

3 Claims, 2 Drawing Figures

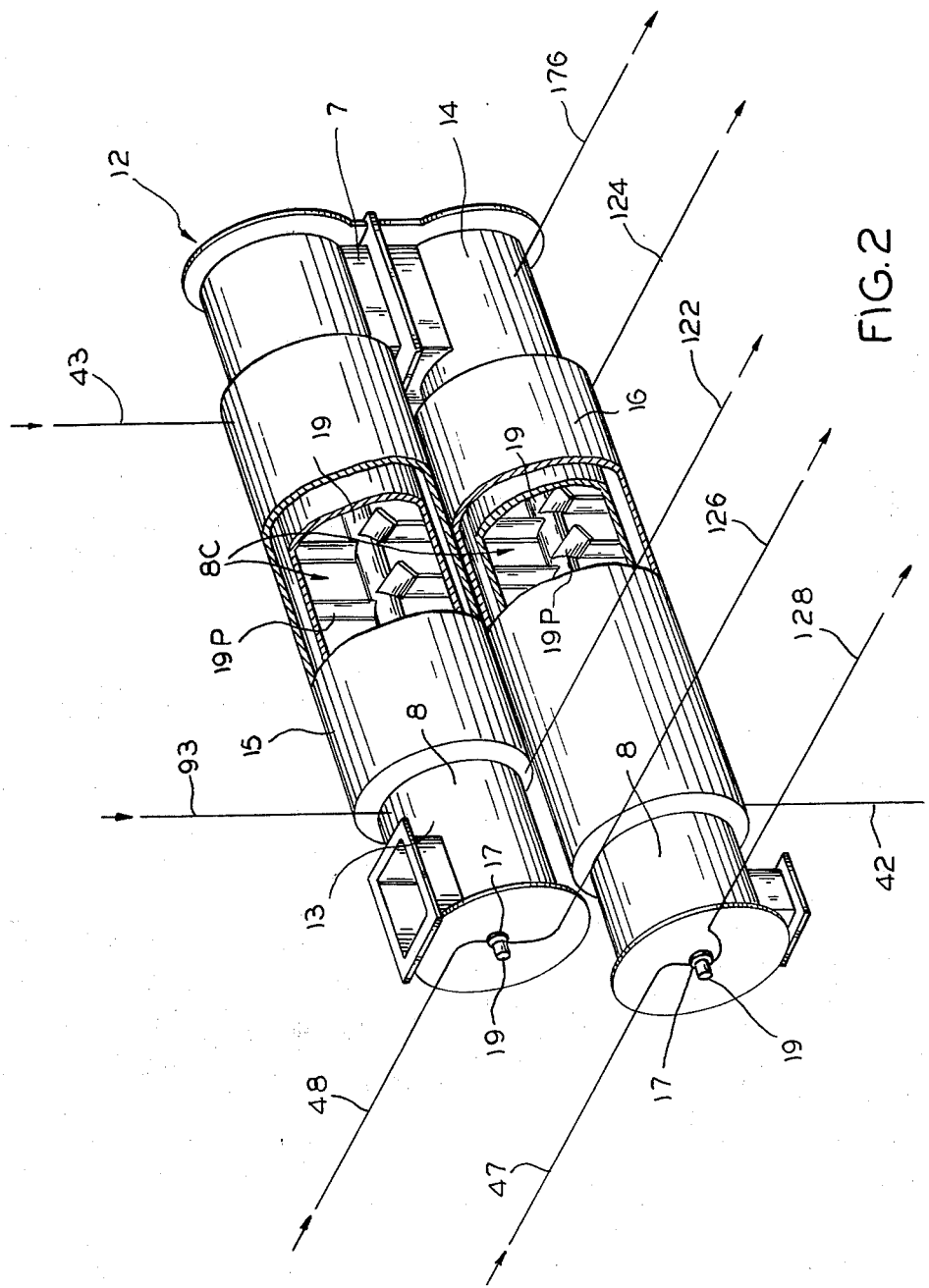

ENERGY CONSERVING METHOD AND APPARATUS FOR PELLETING PARTICULATE ANIMAL FEED

This invention relates to a system of pelleting particulate animal feed, and more particularly, to improvements in the feed pelleting methods and apparatus disclosed in Zarow U.S. Pat. No. 3,573,924 and Zarow and Volk U.S. Pat. No. 3,932,736 (the entire disclosures of where are hereby incorporated herein by this reference).

The basic pellet producing system involved is generally disclosed in said Zarow and Volk patent and comprises a bin for storing a milled feed material in meal form and of a selected composition, a mixer/conditioner for adding selected amounts of heat and moisture to the milled material, a pellet producing machine, and means for feeding the milled material from the bin, through the mixer/conditioner and into the pellet producing machine.

In the arrangement disclosed in said Zarow and Volk patent, the system includes a suitable source of steam and means for supplying the steam to the mixer/conditioner for heating and/or moistening the milled material. The steam conduiting from the steam source includes means for providing both high and low pressure steam (which may be independently selected), and the mixer/conditioner includes means for using the steam to add dry heat to the milled material for preheating same, and a means for adding live steam directly into the material to increase its moisture and temperature content. The mixer/conditioner includes a steam jacket surrounding the chambers of same through which the milled material moves, into which steam jacket steam is supplied to provide dry heat to the milled material. Also provided are means to supply steam directly into the indicated chambers of the mixer/conditioner to thereby increase the moisture content of the material as well as the heat content. The mixer/conditioner also includes mixing devices operating in the indicated chambers thereof to insure a thorough mixing of the steam of the milled material.

The pellet producing apparatus commonly employed in feed pelleting systems of the type indicated is of the die-type comprising a large hollow cylinder formed to have a larger number of feed extruding radial holes through same, and a plurality of rollers mounted within the cylinder in contact with the inside wall of the cylinder. Either the rolls or the die are driven through a gear reducer whereby as the cylinder rotates, the mixed and conditioned milled material is fed into the cylinder, the interaction of the rotating cylinder with the rotating rollers compresses and forces the milled material through the cylinder holes to form solid, worm-like masses which are severed as they are formed to produce feed pellets. The pellet length is cut by a knife located at the outside periphery of the cylinder. As the rolls and cylinder are touching and both are of metallic construction, friction will develop without proper lubrication, lacking which the rolls and die forming cylinder will heat excessively and may expand to the point of seizure; also, the holes in the cylinder will become peened.

In practicing the pelleting systems of the type indicated, the lubrication provided when practicing the system of said Zarow and Volk patent originates from proper mixing of the live steam added to the milled material prior to pelleting. The live steam added has a two fold purpose in terms of lubrication which is to provide heat and water in the milled material (that is obtained by the action of the live steam condensing in the presence of the relatively cool milled material). The basic idea for pelleting purposes is to provide to the pelleting machine a homogeneous milled material mass having a predetermined heat and moisture content that in the practice of the system depends upon the category of feed material being processed.

There are basically three categories of feed materials that for feed pelleting processing purposes require separate consideration. These are feed feeds composed of water soluable ingredients, feeds composed of grain and grain by products, and feeds composed of corn; examples of these categories are outlined at column 1 of said Zarow and Volk patent.

For example, the water soluable feed category includes urea, sugar, minerals, and milk. These ingredients are also heat sensitive.

The water insoluable category is grain and grain by products which basically absorb water. This category is considered to include any feed ingredient other than corn or water soluable ingredients.

Corn is placed in a category by itself because of its gelatinization properties. Any feed formula containing more than 30 percent corn is considered to fall into the corn category.

The system of said Zarow and Volk patent is concerned with the provision of an automatic control arrangement for controlling the moisture content and feed rate of the material as it is fed into the pellet producing machine, the load on the pellet producing machine, and the interrelationships of these parameters during all phases of the system operation. This includes automatic control means for controlling the moisture content and temperature of the milled material as it enters the pellet producing machine.

In a preferred embodiment of the system of said Zarow and Volk patent, the indicated moisture content and temperature control involved is achieved by sensing the temperature of the milled material prior to entering the mixer/conditioner, sensing the temperature of the material as it enters the pellet producing machine, and maintaining the difference in these temperatures (which has been termed Delta T) to within a prescribed range by controlling the supply of steam to the mixer/conditioner accordingly. This approach makes use of the fact that with steam of a selected quality, a given rise in temperature of the feed passing through the mixer/conditioner, achieved by the direct application of live steam to the material, increases the moisture content of the milled material by a predetermined amount. For example, with the application of steam at 100 psig., it has been found that approximately a 20 degree F. rise in the temperature of the milled material produces a 1 percent increase in the moisture content of the milled material. Hence, by measuring the temperature and moisture content of the material prior to its entering the mixer/conditioner, and by knowing the optimum temperature and moisture content for proper pelleting at the pellet producing machine for a given feed composition, a Delta T may be arrived at to achieve the optimum conditions, provided that this Delta T is attained with the selected applications of live steam directly to the milled material as well as dry heat, or both separately. Additionally, there may be circumstances, such as where the moisture content of the milled material is initially quite low, where raw water, liquid molasses, or other sources of moisture should be added as well. Following the disclosure of said Zarow and Volk patent, the proper moisture and temperature of the feed material entering the pelleting machine is obtained by the combined use of dry heat and the steam of selected quality inserted directly in the feed as it passes through the chambers of the mixer/conditioner.

Utilizing these approaches, it has been found that feed of the indicated water soluable category requires no more than about 2 percent moisture addition in the mixer/conditioner utilizing 100 psig. live steam.

In the grain and grain by products category, the moisture content of the feed entering the pelleting machine should be in the range of from approximately 16.5 to approximately 17 percent by weight, and requires the use of 100 psig. live steam insertion in the mixer/conditioner that is necessary to bring the moisture content up to the indicated percentage level.

In the corn feed category, the maximum moisture of the feed entering the pelleting machine should be in the 16.5–17 percent range, which requires the use of 15 psig. live steam insertion into the feed as it passes through the mixer/conditioner.

In this connection, the term "quality steam" means steam with the minimum amount of water content. Steam at 100 psig. inherently has less water than steam at 15 psig., and has a temperature of 338 degrees F. as compared to 250 degrees F. for the 15 psig. steam.

The system of said Zarow and Volk patent is based on the principle that the the efficiency, production rate, and quality of the end feed product is governed by the conditioning of the feed ingredients prior to the pelleting of same. In this connection, it is economically imperative that the moisture of the finished pelleted product be at least equal to or 1 percent greater than the moisture of the feed as the feed enters the pelleting machine to maintain desired quality. A moisture loss during the pelleting step is commonly referred to as a "shrink," which is to be avoided in the practice of the system.

A further criteria that needs to be considered in connection with the economics of any given installation is the amount of energy required to operate same. In analyzing the overall energy requirements for systems of the type disclosed in said Zarow and Volk patent, and other feed pelleting systems utilizing steam heat to add moisture to the feed material, the Applicant has determined that there are several areas of energy loss that have needed consideration.

For instance, live steam utilized to add moisture to the feed in the mixer/conditioner is lost to the basic pelleting system involved. In addition, where the mixer/conditioner is of relatively short length some of the steam added to the feed material may bypass the feed ingredients and escape into the atmosphere.

Further, after pelleting, the newly formed pellet material passes through either a horizontal or vertical cooler at which point moisture and heat in the pellets is flashed off to the atmosphere due to evaporative cooling.

A principal object of the present invention is to improve the feed pelleting system disclosed in said Zarow and Volk patent by modifying the manner in which the feed passing through the mixer/conditioner is conditioned from the standpoint of temperature and moisture content in such a way as to minimize energy requirements while at the same time simplifying and making more effective the use of the live steam available for use in practicing the system.

Other principal objects of the invention are to isolate the feed material as it passes through the mixer/conditioner from steam heat employed to heat same, and to utilize hot water at a temperature approximating but below the vaporization point to add the required moisture to the feed as it passes through the mixer/conditioner.

Still another principal object of the invention is to incorporate the steam heating of the mixer/conditioner in a closed circuit steam system in which the condensate resulting from the application of the steam to the mixer/conditioner to provide the dry heat that is supplied to the feed, in passing through the mixer/conditioner, is returned to the source of steam for recycling through the steam system involved, and to establish a similar closed circuit steam heating system for heating the hot water that is to be inserted into the feed as it passes through the mixer/conditioner.

Other objects of the invention are to provide a pelleting system adapted for full control in the manner described in said Zarow and Volk patent for providing automatic pelleting using the aforementioned Delta T principles, to provide a feed pelleting system of increased efficiency having production rates and quality of product comparable to or better than the system of said Zarow and Volk patent, and to provide a pelleting system that is economical of manufacture, convenient to install and use, that is adaptable for full automation, and that can be easily maintained by semi-skilled labor.

In accordance with the invention, the system of said Zarow and Volk patent is modified and improved by incorporating the live steam system that dry heats the mixer/conditioner in a closed circuit steam in which the condensation formed in the mixer/conditioner by so heating same is returned to the source of steam for recycling through the system. The moisture to be added to the feed as it passes through the mixer/conditioner is provided by inserting water that has been heated to about but below vaporization temperatures, so that the water inserted has maximum heat content below the vaporization point; further, the insert water is so heated by passing same through a steam heated heat exchange that is incorporated in a closed circuit steam system for returning to the source of steam the condensate formed by heating the instant water.

Thus, both heating energy and the water requirements to operate the steam systems involved are conserved while providing for more efficient application of heat and moisture to the feed passing through the mixer/conditioner.

The system of this disclosure makes use of the fact that for a given material composition there is an optimum temperature and moisture content for the material as it enters the pellet mill. By knowing this temperature and moisture content, by knowing the temperature and moisture content of the material in the bin, and by knowing the amount of moisture added to the material with a liquid ingredient (if used) as it enters the mixer/conditioner, and further by properly selecting the amount of dry heat added to the material as it passes through the mixer/conditioner, and by applying water at near but below vaporization temperature levels directly into the mixer/conditioner chambers to mix with the material, then a differential in temperature between the temperature of the material at the bin and the temperature of the material at the pellet mill can be selected that will give optimum pelleting. Hence, the proper moisture content of the material can be maintained at the pellet mill by maintaining a proper differential in temperature between the material at the bin and the material at the pellet mill.

Other objects, uses, and advantages will be obvious or become apparent from a consideration of the following detailed description and the application drawing.

In the drawings:

FIG. 1 is a general schematic diagram showing the general arrangement of a feed pelleting system in accordance with the present invention; and FIG. 2 is a diagrammatic perspective view of the mixer/conditioner illustrating the steam, condensate, and hot insert water conduit connections thereto.

Reference numeral 5 generally indicates the improved system as a whole, which is shown largely diagrammatically.

The supply of milled material from which the pellets are to be made is suitably supplied to a bin 10. The milled material to be processed will basically fall into one of the three categories indicated, which comprise the animal feed formulations most commonly used in the art.

The milled material is fed by an appropriate feed screw auger, or the like where indicated at 11, into a mixer/conditioner 12 having a first stage 13 and a second stage 14 that are respectively equipped with the respective steam jackets 15 and 16 that are only diagrammatically illustrated. The feed screw 11 is rotated to operate same by means of a suitable variable speed feed screw motor 18. Each mixer/conditioner is of essentially conventional construction involving a suitable housing 8 journaling a rotating shaft 19 on which are mounted within the housing 8 conventional mixing paddles 19P that are rotated by the shaft 19 to agitate and add turbulence to the milled material being processed, and feed same longitudinally of the mixer/conditioner stage involved. The steam jackets 15 and 16 encircle the respective housings 8; the housings 8 and their shafts 19 define the respective mixing chambers 8C, which are thus annular, rectilinear, and elongate lengthwise thereof, in addition to being in parallel relation. The mixing chambers 8C are connected by connecting section 7 that extends between the stages 13 and 14. Motor 20 operates the mixing device for the stage 13 and the motor 21 operates the mixing device for the stage 14, of the mixer/conditioner 12.

As disclosed in said Zarow and Volk patent, the shafts 19 of the mixing devices of both stages or sections 13 and 14 of the mixer/conditioner 12 are hollow for application thereto of live steam under pressure through rotary steam-condensate passing joints 17 of a conventional type, to supply dry heat to the milled material, in addition to the dry heat supplied by way of steam jackets 15 and 16.

From the mixer/conditioner 12 the milled material being processed is fed down chute 24 and to the pellet mill comprising the pellet producing means 25. As already indicated, the pellet mill 25 may be of the conventional die type and thus comprise a rotating cylinder with radial holes therein and rollers mounted within the cylinder. The milled material is fed into the cylinder, and by the interaction of the cylinder and rollers, is forced through the holes in the cylinder and is suitably severed to form pellets. The pellet mill 25 is operated by a suitable electric motor 27. After severing the pellets fall through an outlet 28 at the bottom of the pellet mill for further handling including suitable packaging or the like.

As is also disclosed in said Zarow and Volk patent, the chute 24 comprises a lower section 30 hinged at 31 to upper portion 32 located at the outlet of the mixer/conditioner 12, which chute lower portion is pivotally connected as at 34 to the thrust rod 35 of an electrically actuated pneumatic cylinder 36 for purposes described in said Zarow and Volk patent.

From a steam source 37, such as a suitable boiler, or a steam header connected to a suitable boiler, steam line 40 supplies live steam to control valve 41 and thence through line 42 to communication with the steam jacket 16 of the mixer/conditioner stage 15. Line 43 connects the line 42 at suitable joint 44 to supply the steam of line 42 to the steam jacket 15 of stage 13.

The steam from line 40 in the diagrammatic showing provided is fed from line 42 to line 45 that joins line 42 at joint 46, with the line 45 having branches 47 and 48 that are respectively connected to the rotary joints 17 of the respective hollow shafts 19 of the respective mixer/conditioner stages 13 and 15 to heat the shafts 19 of the respective mixer/conditioner sections. The connections to the steam jackets 15 and 16 as well as the steam jackets themselves and the rotary joints are only diagrammatically illustrated as they may be of any suitable type.

In the illustrated embodiment of the invention, the supply of the steam to the steam jackets 15 and 16 and the hollow shafts operating in same is suitably set to supply a constant amount of dry heat to the mixing and agitating chambers 86 of the respective mixer/conditioner sections 13 and 15 and thereby supply a constant amount of dry heat to the milled material as it travels the length of the mixer/conditioner 12. The steam is preferably supplied at 100 psig. and thus has a temperature of 338 degrees F. It will thus be seen that the feed passing through the mixer/conditioner 12 is physically isolated from the steam that supplies the heat for heating the feed.

It is common in the production of feed pellets to add a liquid ingredient, such as liquid molasses, as a source of water, and for palatability, to the milled material as it moves from the bin into the mixer/conditioner 12. Following the disclosure of said Zarow and Volk patent, FIG. 1 illustrates a liquid molasses supply system 74 comprising tank 75 for storing a supply of the liquid ingredient, such as molasses, which is pumped by means of a pump 76 from an outlet in the tank 75 through a line 77, a line 78, a flow meter 79 having combined therewith a tachometer generator 80, through a line 81, a valve 82 having an electrically operated motor and gear train 83 combined therewith for operating the valve 82, and through a line 85 to the input of an electrically operated diverter valve 88. The valve 88 has one output connected by a line 90 to one input of a Y connector 92, the output of which is connected by a line 93 to a suitable nozzle located within, and at the input of, the mixing and agitating chamber 86 of the mixer/conditioner section 13. The other input of the Y connector 92, in accordance with this invention, is connected by conduit 95, control valve 96 and conduit 97 to the source of hot water described hereinafter.

The liquid ingredient in the line 78, which for purposes of this disclosure is assumed to be molasses, is also fed through a line 100, back pressure valve 101, line 102 and line 103 to the input of the tank 75. The second output of the diverter valve 88 is connected by line 105 to the line 103 at suitable joint 106.

In normal operation insofar as the insertion of the molasses into the milled material is concerned, when this is desirable, the molasses is pumped from the tank 75 through the diverter valve 88 in the line 90 into the Y connector 92. At the same time hot water is fed through the valve 96 to the Y connector to mix with the molasses causing turbulence and an elevation of temperature in the molasses as it is fed through the line 93 into the input of the mixing and agitating chamber 86 of the mixer/conditioner section 13. This action produces a thorough mixing of the liquids involved with the milled material as the latter is fed into the mixer/conditioner, which mixing is further completed by the agitation (turbulence) of the material within the chambers 86 of the mixer/conditioner stages as dry heat is added to increase the temperature of the material.

However, when practicing the methods of Zarow U.S. Pat. No. 3,573,924, the molasses is made part of the milled feed supplied to bin 10 by way of adding dehydrated molasses; under these conditions system 74 is not necessary to the practice of the present invention.

Since the load on the pellet mill 25, and therefore the motor 27, is related to the feed rate of the material from the bin 10 to the pellet mill 25, which in turn is related to the speed of the feed screw 11 and the feed screw motor 18, and since the pellet mill load is further related to the temperature and moisture content of the material as it enters the pellet mill, each of these parameters and the relationships between them, are to be controlled for optimum pelleting. This is done in accordance with the disclosure of said Zarow and Volk patent.

In accordance with the invention, the conditioning of the feed ingredients as the feed that is, the milled material, passes through the mixer/conditioner 12 is based on three basic principles of time, temperature, and turbulence, considered in relation to the Delta T principle referred to above, namely the difference in temperature between the feed in the bin 10 and the feed entering the pellet mill 25, and also considered in light of the three basic categories of feeds outlined above.

Insofar as time is concerned, the mixing time of the feed within the mixer/conditioner in accordance with the invention should be a minimum of 17 seconds, and for this purpose the mixing and agitating chambers 86 defined by the stages 13 and 14 are each ten feet long.

With regard to temperature, the temperature and moisture content are related in accordance with the specifics indicated with regard to the three basic feed categories described above in the preferred arrangement. The supply of steam to the mixer/conditioner steam jackets and mixer shafts dry heats the feed material approximately 30 degrees F. as it passes through the mixer/conditioner 12.

In accordance with said Zarow and Volk patent, the moisture content of the milled material or feed in the bin 10 is to be sensed, and, in accordance with this invention, as it is known that the milled material entering the mill must have, for optimum pelleting purposes, the predetermined moisture content referred to for the three categories of feeds outlined above, the additional moisture required in addition to that measured for the material in the bin is supplied by inserting hot water at temperatures approximating but not exceeding vaporization temperatures. Water at 212 degrees F. is preferred.

Furthermore, the use of energy required to operate the system 5 is minimized and the fuel requirements to provide the steam and hot water for the system are also minimized, by utilizing closed circuit systems insofar as the steam heat supply is concerned, to return to the source of heat the condensate that is formed by heating the various components involved.

For this purpose, in the diagrammatic showing of FIG. 1, steam condensate return conduit 120 has connected thereto the condensate feeder conduits 122 and 124 that communicate with the respective mixer/conditioner jackets 15 and 16 to communicate the condensate formed therein by the heating of the respective jackets for return through the conduit 120 to the source of steam 37. Pump 129 is shown employed in the diagrammatically illustrated return line 120 to return the condensate or boiler pressure levels, as needed by the particular installation involved.

Similarly, condensate feeder conduits 126 and 128 communicate between the condensate conduit 120 and the rotary joints 17 of the respective mixer/conditioner section shafts 19 for returning to the steam source the condensate formed by the heating of the respective mixer shafts. This is for the purpose of avoiding loss of the water employed to steam heat the mixer/conditioner steam jackets and shafts for recycling of same through the steam system.

As indicated, it is a further feature of the invention that the moisture that is to be added to the feed passing through the mixer/conditioner 12 be supplied by hot water rather than steam. This is from the standpoint that to convert one pound of water to one pound of steam it requires 970 BTU's, whereas it requires only 1 BTU to raise the temperature of one pound of water 1 degree F. By utilizing water as the moisture providing insert to the feed passing through the mixer/conditioner 12, for every pound of water used that is at the maximum temperature without boiling, say 212 degrees F. at sea level, 970 BTU's is saved for each pound of vapor formerly employed for purposes of moisturizing the feed in the mixer/conditioner by steam insertion into the feed.

Furthermore, another feature of the present invention is that the boiler heating system for heating the water to be inserted in the feed is also made a closed circuit steam heat system.

Referring again to FIG. 1, conduit 130 communicates between the steam source 37 and a steam jacket 132 of heat exchanger 134 that also includes vessel 136 in which the water to be inserted in the feed material is heated prior to insertion into the feed material at the mixer/conditioner 12.

The heat exchanger 134 is only diagrammatically illustrated as it may be of any suitable type having a water heating vessel 136 associated with suitable steam jacket 132, the latter being in encircling relation with the external wall 138 of the vessel 136 and defining an annular steam receiving chamber 140 therebetween into which the steam from conduit 130 passes. The condensate formed by the heating of the water in the vessel 136 is returned to the steam source through conduit 142 which is equipped with a suitable strainer 144, steam trap 146, and check valve 148 and condensate pump 150. Steam jacket 132 is, of course, applied to vessel 136 in fluid tight sealed relation thereabout. Conduit 120 upstream of pump 129 may also be equipped with the strainer 144, steam trap 146, and check valve 148, as may be needed (not shown).

Water from a suitable source such as a water main under suitable head conditions is suplied to conduit 152 that is equipped with suitable pressure regulator 154 and pressure gauge 156, and that is connected to the inlet 158 of a rotameter 160 that is equipped with a suitable flow control valve 162 that preferably operates automatically. The water passes from the rotameter at its outlet 164 into its outlet 164 into conduit 166 that is equipped with water meter 168 and check valve 170, that is connected to the vessel 136 at its inlet 172. The heated water passes from the vessel 136 at its outlet 174 into conduit 176 that is equipped with thermometer 178 and check valve 180. The conduit 176 extends to the mixer/conditioner stage 14 where it makes suitable leak free connection to housing 8 in open communication with the mixing chamber 8C defined by stage 14 where the conduit 176 is open to the passing feed material moving toward the outlet of the stage 14, for application of the hot water to same. Conduit 97 is connected to conduit 176 for receiving hot water therefrom for application to the molasses (as previously described).

As disclosed in said Zarow and Volk patent, the bin 10 is equipped with a temperature senser 106 and the chute upper portion 32 is equipped with temperature senser 109 to sense the temperature of the feed material at these locations in the system, pursuant to the disclosure of said Zarow and Volk patent. The volume flow of the heated water from the vessel 136 is controlled in any suitable manner with the flow control valve 162 of the rotameter being the fluid flow control mechanism for this improvement. The steam rate flow through the heat exchanger 134 is controlled in a conventional manner such as by employing in line 130 steam modulating valve 131 that is similar to the valve 57 of the Zarow and Volk patent, to heat the water in vessel 136 such that the water leaving the vessel 136 will be at approximately 212 degrees F., or in any event, no higher than the temperature which would cause vaporization of the water.

Since in accordance with this improvement, the moisture added to the feed passing through the mixer/conditioner 12, comes by way of the water insert flow from the heat exchanger 134, the need to provide for the alternate supply of live steam to the mixer/conditioner in the alternate 15 psig. and 100 psig. pressure ranges described in said Zarow and Volk patent is eliminated. Of course, for special situations provision may be made in this manner for selectively supplying small amounts of live steam.

With these modifications in mind, the system 5 may be operated and controlled in a manner similar to that disclosed in said Zarow and Volk patent, using the automatic control system there disclosed. The control valve 41 is adjusted to supply steam at 100 psig. to the respective steam jackets and rotating shafts of the mixer/conditioner stages 13 and 14, and the conduiting providing for return of the condensate to the steam source set in operation and adjusted as necessary to provide for continuous operation of the system.

Similarly, steam is supplied to the steam jacket 132 of heat exchanger 134 by suitably adjusting control valve 131 of conduit 130, as is needed to heat the water of vessel 136 to the temperature levels indicated. Of course, the condensate return conduiting 142 and associated components are made operative to return the condensate formed in heat exchanger 134 by the heating of the water in vessel 136 to the steam source 37.

For initial startup, the water insert from heat exchanger 134 is held in abeyance until the milled feed initially supplied to the mixer/conditioner 12 has passed through same and has reached the pellet mill 25 when the hot water from the heat exchanger 134 is admitted for insertion in the mixer/conditioner stage 14. Meanwhile the application of the liquid molasses to the feed, where employed, is to be started following the teachings of said Zarow and Volk patent by placing the pump 76 in operation and suitably adjusting hot water supply control valve 96 of conduit 97. Of course, the amount of the liquid molasses added to the milled material at the input of the mixer/conditioner 12 affects the amount of hot water that is to be inserted elsewhere into the milled material passing through the mixer/conditioner to attain the optimum moisture content at the pellet mill 25.

As the system 5 goes into full operation, the Delta T criteria of said Zarow and Volk patent are met for the different categories of feed involved by observing the aforementioned principles pertaining to the temperature and water content of the feed. The dry heat supplied at the mixer/conditioner is to raise the temperature of the feed approximately 30 degrees F., and the volume of hot water inserted into the feed passing through the mixer/conditioner is adjusted as needed to bring the moisture percentage of same up to the predetermined optimum percentages (by weight) that have been indicated, keeping in mind that a 1 percent by weight raw water addition to the feed is equivalent to approximately a 20 degree F. temperature rise, and the addition of 1 percent wet molasses added to the milled material is equivalent to a 6 degree F. temperature rise. The feed being processed is thus fully isolated from the steam employed as the feed passes through the mixer/conditioner; of course, the feed is similarly isolated from the condensate resulting from the dry heating of the feed that is involved.

The mixer/conditioner 12 is sized for any particular application in accordance with the horsepower of the pellet mill employed. For instance, for a one hundred horsepower mill, the stage 13 is twelve inches in diameter and the stage 14 is sixteen inches in diameter; for a two hundred horsepower mill, both stages 13 and 14 are sixteen inches in diameter; and for a three hundred horsepower mill, both stages are twenty-four inches in diameter. Both stages in each case are ten feet long and the diameter referred to is the external diameter of the housing 8.

It will thus be seen that the system may be set up so that the insertion of the hot water, which should be at a temperature approximating but below the vaporization temperature thereof, is the only variable needed to achieve optimum pelleting conditions. The criteria of time is obtained by the length of time of passage of the feed being conditioned through the mixer/conditioner 12 (which should be a minimum of 17 seconds), and the criteria of turbulence is provided by the action of the rotating mixing paddles 19P within the annular mixing chambers 86 that are involved, through which the feed being mixed is passed by the action of the mixing paddles in a turbulent annular manner.

The energy conservation practiced by the system 5 is concerned with the closed circuit steam systems through which the water and water vapor is cycled to heat the steam jackets and rotating shafts of the mixer/conditioner 12 as well as the closed circuit steam system that is employed to heat the heat exchanger 134.

Furthermore, since hot water at, for instance, 212 degrees F., provides the sole source of added moisture to the feed being processed, the heat requirements as compared to utilizing steam for the same pur ose will be reduced at the rate of at least 970 BTU's per pound of fluid involved. Further, the application of the hot water insert to the feed instead of steam is a more efficient way of utilizing the moisture providing agencies available. Also, the problem of the steam bypassing the feed ingredients that may be experienced when using the steam insert approach with short length mixers is avoided with resulting energy savings and savings of the moisture providing agencies.

Practical experience in practicing the present invention, using the herein disclosed hot water application to the feed and the closed circuit steam system employed in connection therewith, as compared to the live steam application to the feed disclosed in Zarow et. al. U.S. Pat. No. 3,932,736, indicate that energy requirements are reduced in the range of from about 25 percent to about 60 percent, with an increase in production rate of at least 30 percent; furthermore, using the standard feed pellet durability test the invention provides good quality pellets in the range of 90–95 percent, as compared to 85–90 percent using the system insert approach.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In an animal feed pelleting mill including a feed pellet producing apparatus, a steam jacketed mixer/conditioner including means for feeding milled animal feed through same to said pellet producing apparatus and means for mixing the animal feed as it is fed through the mixer/conditioner, means for supplying steam to the mixer/conditioner for heating the animal feed as it is fed therethrough, and means for supplying moisture to the feed being fed through the mixer/conditioner, the improvement wherein:

said steam supplying means comprises a steam system including a source of steam, supply conduiting for communicating live steam from said source to said mixer/conditioner, and return conduiting for returning condensation to the source of steam, said system including means for isolating the feed from the steam and condensation of said system, said system being in closed circuit relation for returning to the heat source the condensate created by the supplying of the steam to the mixer/conditioner, said moisture supplying means comprising:

a source of water under pressure, a heat exchanger including a vessel having an inlet and an outlet, with said vessel defining a water heating chamber, and a steam receiver in heat exchange relation with said vessel having an inlet and an outlet and that is free of fluid communication with said vessel chamber, infeed water conduiting communicating between said source of water and said vessel inlet, outfeed water conduiting communicating between said vessel inlet and said mixer/conditioner including means for inserting water into the feed being fed through the mixer/conditioner, said vessel and said water conduiting forming a continuous flow water supply system and including flow control means for setting water flow therethrough at a predetermined rate, said heat exchanger including steam infeed conduiting communicating live steam from said steam source and return conduiting for returning condensation in said heat exchanger to said steam source, said heat exchanger steam infeed and condensate return conduiting and said receiver being in closed circuit relation for returning to the heat source the condensate created by the supplying of the steam to said heat exchanger receiver, means for controlling the supply of steam through said steam system from said steam source to the mixer/conditioner to heat the feed being fed by the mixer/conditioner to the pellet producing apparatus to a predetermined temperature level above the temperature of the feed entering the mixer/conditioner, and means for controlling the supply of steam to said heat exchanger receiver to heat the water passing from said heat exchanger vessel outlet to a predetermined temperature level free of boiling.

2. The improvement set forth in claim 1 wherein:

said flow control means of said water supply system includes means for maintaining the amount of water inserted in the feed to a predetermined percent by weight, and wherein said predetermined temperature level of the feed is about thirty degrees F.

3. The improvement set forth in claim 2 wherein:

said mixer/conditioner is proportioned lengthwise of the direction of feed therethrough whereby the feed in being fed through the mixer/conditioner has a feed through time that at least approximates seventeen seconds.

* * * * *